May 31, 1932.  H. HAMEL  1,861,088
COUPLING DEVICE
Filed Aug. 14, 1929
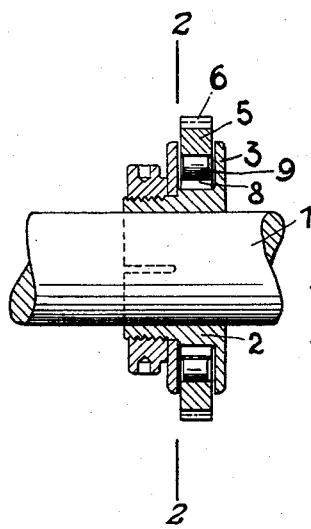
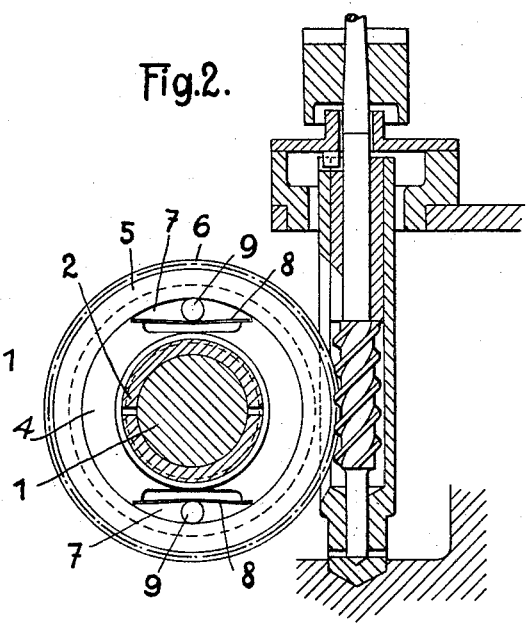
Witnesses:
Joseph Mühle
Curt Lehmann
Inventor:
Hermann Hamel Patented May 31, 1932

1,861,088

UNITED STATES PATENT OFFICE

HERMANN HAMEL, OF DRESDEN, GERMANY

COUPLING DEVICE

Application filed August 14, 1929, Serial No. 385,909, and in Germany December 19, 1927.

The present invention relates to a coupling device for the spindle driving wheels in spinning, twisting and winding machines and applies exclusively to those spinning, twisting and winding spindle drives, in which each of the spindles arranged in close juxtaposition is rotated by a separate driving wheel.

In the known types the separate driving wheels are arranged on a common driving shaft and cooperate in the rotation of the latter as soon as the coupling device begins to act, such coupling devices being well known to the prior art. In order to couple the spindle driving wheels with the driving shaft, some of the known types provide, for example, each driving wheel, which preferably consists of a driving and driven part, with suitable clamping means such as bills or rolls arranged between wedge-like surfaces and adapted to engage these slanting surfaces during rotation and thus to cause a driving effect.

Coupling devices of this kind act, however, as fixed or positive clutches and for this reason cannot be employed everywhere, one of their great drawbacks being, for instance, that individual driving wheels cannot be stopped at will during the rotation of the driving shaft. Stopping of the driving wheels and the spindles driven by them is quite often required in practical operation and especially when changing spools. Attempts have been made to replace such positive clutches by friction clutches, but it was found that in view of the high speed the spindles could be stopped only with considerable force. Moreover, owing to the great friction, heat developed to such an extent that it had an unfavorable effect upon the driving parts.

The present invention eliminates these drawbacks by providing each driving wheel with a flexibly acting clutch which becomes effective the moment the driving shaft is rotated and which is rendered ineffective as soon as the driving wheel is held back by a mechanical counter-force.

One embodiment of the invention is illustrated in the accompanying drawings, in which Figure 1 is a sectional view of a coupling device according to the invention, the catching or driving effect being brought about by clamping rolls; and Fig. 2 is a cross section of the driving wheel on the line 2—2 of Fig. 1.

Referring to the drawings, the driving shaft 1 carries the driving part 2 which possesses preferably a slotted neck and can be clamped to the driving shaft by screwing a spring ring to the neck. Between the shoulder 3 of the part 2 and a ring 4 the rim 5 provided on its circumference with worm gearing 6 is guided so that it rotates easily. The driving part 2 is provided with the recesses 7 having small bearing surfaces for the springs 8 on both sides. Between the springs 8 and the inner concentric surface of the rim 5 the driving rolls 9 are embedded.

Into the space of wedge-like shape formed by the plane surfaces of the springs 8 and the concentric surfaces of the rim 5 the rolls 9 move during the rotation of the driving shaft 1 and thus act as clamping means. The springs 8 rest on both ends on their bearing surfaces so that the spring bridge formed by them may sag to a certain extent, which is highly desirable to transform the otherwise fixed clutch into a flexible one.

If the rim 5 be held back in any manner, for instance by braking the spindle driven by it, the result is that the rolls will rotate about their own axes and the driving effect will cease instantly.

I claim:—

In a coupling device for spindle driving wheels in spinning, twisting and winding machines provided, for each spindle, with a separate driving wheel, in which drive between a rotary driving and driven member is effected by a clamping effect caused by rolls and inclined surfaces, a driving member having a recessed periphery and bridges inserted in a chord-like manner in the recesses of the driving member, the said bridges consisting each of a flat leaf spring and serving as resilient abutments for freely movable coupling rolls rotating thereon.

In testimony whereof I have affixed my signature.

HERMANN HAMEL.